(12) United States Patent
Gull et al.

(10) Patent No.: US 10,919,629 B2
(45) Date of Patent: Feb. 16, 2021

(54) VEHICLE, SYSTEM, AND METHOD FOR VERTICAL TAKE-OFF AND LANDING

(71) Applicant: TALYN AIR, INC., Los Angeles, CA (US)

(72) Inventors: James Gull, Los Angeles, CA (US); Evan Mucasey, Culver City, CA (US)

(73) Assignee: TALYN AIR, INC., Los Angeles, CA (US)

( * ) Notice: Subject to any disclaimer, the term of this patent is extended or adjusted under 35 U.S.C. 154(b) by 0 days.

(21) Appl. No.: 16/788,935

(22) Filed: Feb. 12, 2020

(65) Prior Publication Data

US 2020/0361606 A1 Nov. 19, 2020

Related U.S. Application Data

(60) Provisional application No. 62/847,709, filed on May 14, 2019.

(51) Int. Cl.
| | |
|---|---|
| *B64D 5/00* | (2006.01) |
| *B64C 29/00* | (2006.01) |
| *B64C 39/04* | (2006.01) |
| *B64D 27/02* | (2006.01) |
| *B64C 11/46* | (2006.01) |
| *B64C 25/00* | (2006.01) |
| *B64C 39/08* | (2006.01) |

(52) U.S. Cl.
CPC ............... *B64D 5/00* (2013.01); *B64C 11/46* (2013.01); *B64C 25/00* (2013.01); *B64C 29/0033* (2013.01); *B64C 39/04* (2013.01); *B64C 39/08* (2013.01); *B64D 27/02* (2013.01)

(58) Field of Classification Search
CPC .......... B64D 5/00; B64D 27/02; B64C 25/00; B64C 29/0033; B64C 39/04; B64C 39/08; B64C 11/46; B64C 37/02
See application file for complete search history.

(56) References Cited

U.S. PATENT DOCUMENTS

| | | | | |
|---|---|---|---|---|
| 5,000,398 | A * | 3/1991 | Rashev | B64C 27/08 244/110 E |
| 8,950,698 | B1 * | 2/2015 | Rossi | B64C 29/0033 244/2 |
| 10,450,062 | B1 * | 10/2019 | Bova | B64C 5/06 |
| 2017/0274997 | A1 * | 9/2017 | von Flotow | B64D 5/00 |
| 2019/0061936 | A1 * | 2/2019 | North | B64C 29/0033 |
| 2019/0100312 | A1 * | 4/2019 | Fen | B64D 5/00 |
| 2019/0329886 | A1 * | 10/2019 | Pinto | B64D 9/00 |

* cited by examiner

*Primary Examiner* — Rodney A Bonnette
(74) *Attorney, Agent, or Firm* — Finnegan, Henderson, Farabow, Garrett & Dunner, LIP

(57) ABSTRACT

Disclosed herein are a vehicle system and method for VTOL. The vehicle system includes: a carrier vehicle and a cruise vehicle. The carrier vehicle includes one or more fuselages, one or more wings, one or more attach units coupled to the one or more fuselages or to the one or more wings, and propulsion systems operable to provide, at least, substantially vertical thrust and substantially horizontal thrust. The cruise vehicle includes one or more fuselages for carrying passengers or cargo and one or more wings. The one or more attach units of the carrier vehicle are adapted to couple to the cruise vehicle to detachably engage.

23 Claims, 12 Drawing Sheets

VEHICLE, SYSTEM, AND METHOD FOR VERTICAL TAKE-OFF AND LANDING

TECHNICAL FIELD

The disclosure relates generally to the field of vertical take-off and/or landing (VTOL), and more particularly, to a vehicle, system, and method for VTOL.

BACKGROUND

Multiple concepts have been proposed for VTOL aircraft for urban and regional travel. High energy density batteries and efficient motors are critical for electric powered aircraft. Batteries currently provide about 250 Wh/kg energy density and electric motor power densities have improved to the point where they are beginning to offer credible solutions. Over 100 companies are pursuing various alternative designs. Known solutions, however, suffer the disadvantages of the mismatched and sometimes competing requirements for VTOL and cruise operation. Aircraft typically must carry heavy batteries and extra motors that are only used for VTOL operations. These systems produce high levels of drag during horizontal, fixed wing flight cruise operations due to the use of vertical rotors and their accompanying support and control structures. These mismatched requirements for VTOL and cruise reduce the speed and range of these alternatives. Consequently, most designs do not come close to their published values for speed and range in operation and are limited in scope and mission.

A limiting factor for traditional VTOL designs is that take-off/landing is a high-power event. Current battery systems typically do not have high enough power to discharge energy rapidly enough, particularly at lower energy levels (state of charge), resulting in an effective energy capacity of approximately 50% the theoretical value in flight.

SUMMARY

In some embodiments, an exemplary vehicle system for VTOL includes: a carrier vehicle; and a cruise vehicle. The carrier vehicle includes one or more fuselages, one or more wings, one or more attach units coupled to the one or more fuselages or to the one or more wings, and propulsion systems operable to provide, at least, substantially vertical thrust and substantially horizontal thrust. The cruise vehicle includes one or more fuselages for carrying passengers or cargo and one or more wings. The one or more attach units of the carrier vehicle are adapted to detachably engage the cruise vehicle.

In some embodiments, an exemplary method performed by a carrier vehicle for VTOL includes: coupling to a cruise vehicle with an attach unit of the carrier vehicle being coupled to the cruise vehicle; elevating the cruise vehicle to a release altitude with propulsion systems of the carrier vehicle providing substantially vertical thrust for at least party of this stage; accelerating the cruise vehicle to a release speed with the propulsion systems providing substantially horizontal thrust; and releasing the cruise vehicle by decoupling the attach unit from the corresponding attach location.

In some embodiments, an exemplary method performed by a carrier vehicle for VTOL includes: elevating to a rendezvous altitude with propulsion systems of the carrier vehicle providing substantially vertical thrust; accelerating to a rendezvous speed with the propulsion systems providing substantially horizontal thrust; a cruise vehicle proceeding under substantially horizontal thrust; rendezvousing with a cruise vehicle by coupling an attach unit of the carrier vehicle to the cruise vehicle; decelerating the cruise vehicle with the propulsion systems providing substantially horizontal thrust; and descending to a destination site with the propulsion systems providing substantially vertical thrust.

Both the foregoing general summary and the following detailed description are exemplary and do not restrict the invention, as claimed.

BRIEF DESCRIPTION OF THE DRAWINGS

The accompanying drawings, which are incorporated in and constitute a part of this disclosure, illustrate embodiments and, together with the description, serve to explain the principles of the invention.

DETAILED DESCRIPTION

Figure 1A:
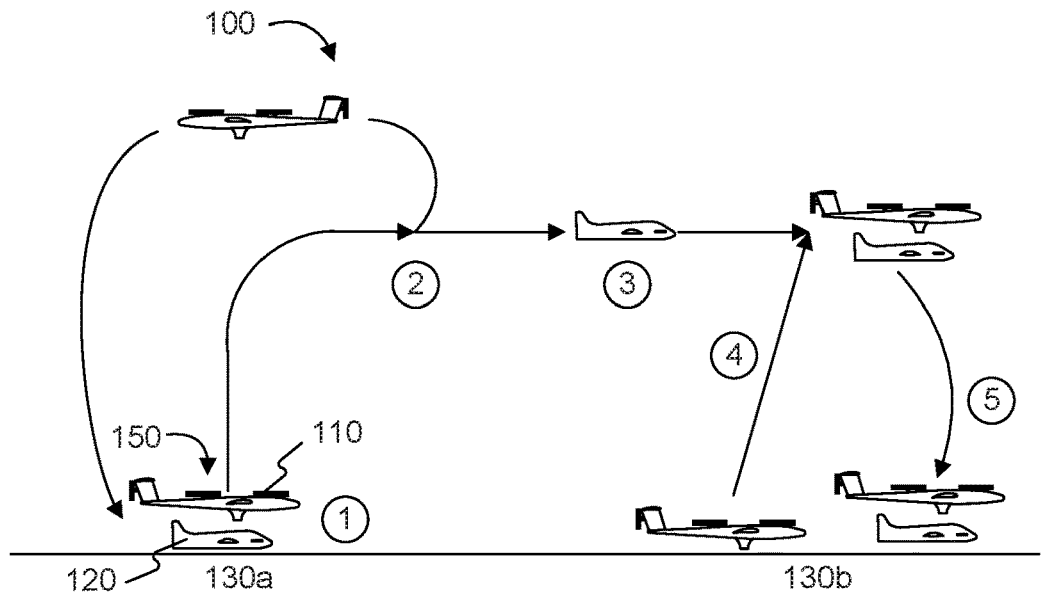
FIG. 1A is a schematic representation of an exemplary sequence of a staged flight of a VTOL vehicle system including a carrier vehicle and a cruise vehicle according to some embodiments of the disclosure.

Reference will now be made in detail to exemplary embodiments, examples of which are illustrated in the accompanying drawings. The following description refers to the accompanying drawings in which the same or similar numbers in the various drawings represent the same, similar, or corresponding elements, unless otherwise noted. The exemplary embodiments are not to be read to limit or define the scope of the disclosure. The embodiments set forth in the following description are exemplary embodiments and do not represent all embodiments consistent with the invention. Instead, they are merely examples of apparatuses, systems, and methods of operation consistent with aspects related to the invention as recited in the appended claims.

Embodiments of the disclosure provide a vehicle and a method for VTOL. The vehicle for VTOL may be a carrier vehicle, including: one or more fuselages; one or more wings; one or more attach units coupled to the one or more fuselages or to the one or more wings; and propulsion systems operable to provide, at least, substantially vertical thrust and substantially horizontal thrust.

For take-off, the carrier vehicle may couple to a cruise vehicle, e.g., a vehicle for carrying passengers or cargo, with the attach unit of the carrier vehicle being coupled to corresponding attach location on the cruise vehicle, elevate the cruise vehicle to a release altitude with propulsion systems providing substantially vertical thrust, accelerate the cruise vehicle to a release speed with the propulsion systems providing substantially horizontal thrust, and then, release the cruise vehicle by decoupling the attach unit of the carrier vehicle from the corresponding attach location on the cruise vehicle. The cruise vehicle may then proceed under substantially horizontal thrust to a desired location.

For landing, the carrier vehicle may elevate to a rendezvous altitude with the propulsion systems providing substantially vertical thrust, accelerate to a rendezvous speed substantially matching that of the cruise vehicle with the propulsion systems providing substantially horizontal thrust, rendezvous with a cruise vehicle by coupling the attach unit of the carrier vehicle to corresponding attach location on the cruise vehicle, decelerate the cruise vehicle with propulsion systems providing substantially horizontal thrust, and then descend to a destination site with propulsion systems providing substantially vertical thrust.

Embodiments of the disclosure also provide a vehicle system for VTOL. The system includes a carrier vehicle in accordance with some embodiments and a cruise vehicle. The cruise vehicle includes: one or more fuselages for carrying passengers or cargo; one or more wings; and one or more attach locations coupled to the one or more fuselages or to the one or more wings. The one or more attach units of the carrier vehicle are operable to couple with the one or more attach locations.

Embodiments disclosed in the disclosure have multiple technical effects. For example, the carrier vehicle may allow the cruise vehicle to be released and to rendezvous with the cruise vehicle in horizontal flight, without the cruise vehicle flying through rotor downwash or in-flow, and at similar angles of attack. In conjunction with the carrier vehicle, the cruise vehicle can be flexible, versatile, capable of taking off and landing from locations with limited or no runway facilities, fast, inexpensive, and have substantial range.

A purely electric power system may be cheaper and greener than hybrid-electric VTOL solutions. For example, in some embodiments, a fully electric solution may yield a 300 nm range at 200 kts airspeed for 4 passengers, providing an over two times improvement over conventional eVTOL. In some embodiments, a heavy-lift, short-range version of a carrier vehicle can carry 6-10 passengers or more in a fixed pod, allowing them to be transported on short, heavily trafficked routes. The heavy-lift carrier vehicle may be scalable to large number of passengers for inter-city short duration flights, or cargo carrying missions.

FIG. 1A is a schematic representation illustrating an exemplary sequence 100 of a staged flight of a VTOL vehicle system 150 according to some embodiments of the disclosure. As shown in FIG. 1A, VTOL vehicle system 150 may include a carrier vehicle 110 and a cruise vehicle 120. In some embodiments, carrier vehicle 110 may be an unmanned, manned, piloted, or remotely piloted, fossil fuel, hydrogen, electric, or hybrid-electric powered, vehicle for VTOL. Cruise vehicle 120 may be an unmanned, manned, or piloted, fossil fuel, hydrogen, electric, or hybrid-electric powered, vehicle for carrying passengers or cargo.

At stage 1, carrier vehicle 110 may couple to cruise vehicle 120 on, for example, a launch site 130a. The launch site 130a may be any suitable location that allows the carrier vehicle 110 to take off or land, with or without the cruise vehicle 120. In some embodiments, the launch site 130a may be in an area that cannot accommodate a conventional runway. The launch site 130a may be a Vertiport or Helipad or other flat surface, uneven terrain, a heavily-populated area, a ship, or any other location not suitable for conventional, fixed-wing aircraft that require runway space to accelerate for take-off and decelerate for landing. In some embodiments, launch site 130a may include a runway for conventional take-off or landing.

Figure 1B:
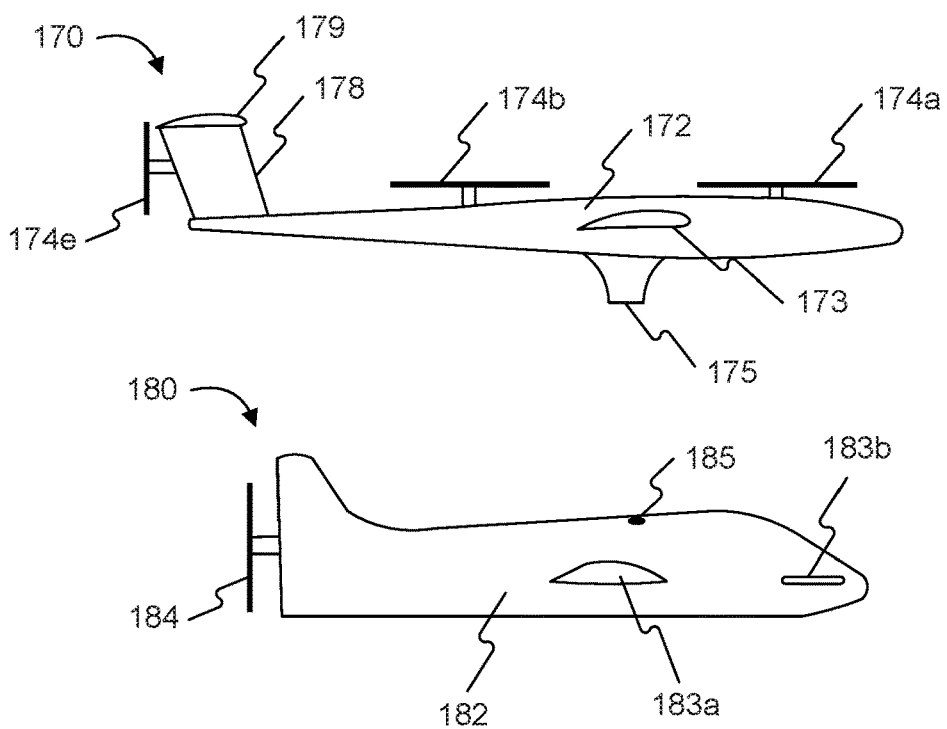
FIG. 1B is a schematic cross-section view of an exemplary VTOL vehicle system according to some embodiments of the disclosure.

FIG. 1B illustrates a schematic cross-section view of an exemplary VTOL vehicle system 160 according to some embodiments of the disclosure. As shown in FIG. 1B, VTOL vehicle system 160 may include a carrier vehicle 170 and a cruise vehicle 180. Persons of ordinary skill in the art would appreciate that VTOL vehicle system 160, carrier vehicle 170 and cruise vehicle 180 can be implemented as VTOL vehicle system 150, carrier vehicle 110 and cruise vehicle 120 of FIG. 1A, respectively.

As shown in FIG. 1B, carrier vehicle 170 may include an attach unit 175 for coupling to an attach location 185 on cruise vehicle 180. Attach unit 175 of carrier vehicle 170 and attach location 185 on cruise vehicle 180 may include any suitable mechanism that is adapted to facilitate the coupling and capture of carrier vehicle 170 to or by cruise vehicle 180. For example, attach unit 175 of carrier vehicle 170 may be a male connector, while attach location 185 on cruise vehicle 180 may include a corresponding female connector, or vice versa. In some embodiments, attach unit 175 of carrier vehicle 170 may be a universal capture mechanism. For example, attach unit 175 of carrier vehicle 170 may be an adjustable grappling arm to latch onto a wing 183a of cruise vehicle 180 or to a fuselage 182 of cruise vehicle 180, or a cooperating component of carrier vehicle. This may allow carrier vehicle 170 to couple to and capture various cruise vehicles 180 with different configurations, arrangements of rotor and lift surfaces, wing-spans, widths, and sizes, including existing, new, or to be developed aircraft designs.

At stage 2 of FIG. 1A, carrier vehicle 110 may elevate cruise vehicle 120 from the launch site 130a to a release altitude, accelerate cruise vehicle 120 to a release speed, and then release cruise vehicle 120. Carrier vehicle 110 may include a plurality of propulsion systems, such as rotors or fans (hereinafter referred to as rotor(s)), axial compressors, or the like. The plurality of propulsion systems are operable in at least two modes. In a first mode, the propulsion systems provide substantially thrust in a substantially vertical direction, while in a second mode, the propulsion systems provide thrust in a substantially horizontal direction.

In some embodiments, the propulsion systems may include a plurality of rotors. At least one or more lift rotors may be operable in the first mode to provide substantially vertical thrust, and one or more cruise rotors may be operable in the second mode to provide substantially horizontal thrust. For example, in the first mode, one or more of the lift rotors may be powered by an engine or a motor to provide substantially vertical thrust, while in the second mode, one or more of the cruise rotors may be powered by an engine or a motor to provide substantially horizontal thrust. The lift rotor and cruise rotor may be independent from each other or interchangeable with each other.

Although the first mode and second mode of the carrier vehicle 110 are separately described, it is appreciated that, in some embodiments, the first mode and the second mode may be combined. For example, the carrier vehicle may be operated in a combination of first mode and the second mode, allowing the carrier vehicle to accelerate horizontally while also elevating (with or without cruise vehicle 120) vertically.

In some embodiments, carrier vehicle 110 may transition from first mode to second mode over a period of time. Specifically, the carrier vehicle 110 may lift cruise vehicle 120 with vertical thrust from propulsion systems. When approaching the release altitude, the carrier vehicle 110 may increase horizontal thrust to provide acceleration in a horizontal direction. For example, the carrier vehicle 110 may power one or more of the lift rotors to lift cruise vehicle 120 with substantially vertical thrust. When approaching the release altitude, the carrier vehicle 110 may power one or more of the cruise rotors to accelerate the cruise vehicle 120 to cruise speed.

The generation of lift over a wing of the carrier vehicle 110 and/or the cruise vehicle 120 may increase as the carrier vehicle 110 accelerates horizontally toward cruise speed. The carrier vehicle 110 may decrease the amount of vertical thrust while increasing the amount of horizontal thrust. In addition, the carrier vehicle 110 may also increase horizontal thrust to expedite acceleration to cruise speed. For example, the carrier vehicle 110 may decrease the thrust provided by the lift rotors and increase the thrust provided by the cruise rotors. As another example, the carrier vehicle 110 may change the orientation of lift rotors (e.g., tilt rotors) to decrease vertical thrust while increasing horizontal thrust.

With horizontal thrust, the carrier vehicle may accelerate the cruise vehicle 120 horizontally to a transition speed. At the transition speed, the lift over the wing of the carrier vehicle 110 and/or the cruise vehicle 120 is sufficient to sustain cruise operation. The carrier vehicle 110 may then decrease or eliminate vertical thrust and continue to carry cruise vehicle 120 supported by lift supplied by the wing. For example, the carrier vehicle 110 may turn off power to the lift rotors. As another example, the carrier vehicle 110 may change the orientation of the lift rotors (e.g., tilt rotors) to a direction at which lift rotors only provide horizontal thrust.

When elevating the cruise vehicle 120 to the release altitude and accelerating it to the release speed, the carrier vehicle 110 may decouple from and release cruise vehicle 120 with the vertical thrust being reduced substantially or, preferably, turned off. After release, cruise vehicle 120 may fly to its destination and carrier vehicle 110 may fly away for landing or for another VTOL mission. Carrier vehicle 110 may turn on vertical thrust after separating from cruise vehicle and cruise vehicle has travelled far enough away from carrier vehicle 120 to avoid prop wash from carrier vehicle 110. Carrier vehicle 110 may release cruise vehicle 120 without cruise vehicle 120 flying through downwash or in-flow of propulsion systems (e.g., rotors) of carrier vehicle 110.

Referring to FIG. 1B, for example, carrier vehicle 170 may include a plurality of rotors, e.g., rotors 174*a*, 174*b*, and 174*e*. Rotors 174*a*-174*b* may be lift rotors coupled to a fuselage 172 or a wing 173, while rotor 174*e* may be a cruise rotor (e.g., a push propeller) coupled to fuselage 172, wing 173, or a tail (e.g. a vertical tail 178).

At stage 2 of FIG. 1A, the plurality of rotors of carrier vehicle 110 may operate in the first mode to lift carrier vehicle 110 and cruise vehicle 120 from the launch site 130*a* to a release altitude. For example, the lift rotor (e.g., rotors 174*a*-174*b* of FIG. 1B) may be powered by an engine or a motor to provide substantially vertical lift thrust. At the release altitude, the plurality of rotors may operate in a second mode to accelerate cruise vehicle 120 to a release speed. For example, the cruise rotor (e.g., rotor 174*e* of FIG. 1B) may be powered by an engine or a motor to provide substantially horizontal acceleration thrust.

When operating under reduced or no vertical thrust, carrier vehicle 110 may release cruise vehicle 120. For example, referring to FIG. 1B, attach unit 175 of carrier vehicle 170 may be decoupled with attach location 185 on cruise vehicle 180 to release cruise vehicle 180. The decoupling may be initiated by carrier vehicle 110, cruise vehicle 120, a remote-control (not shown in FIG. 1A) (e.g., a flight control center on the ground), or a pilot (not shown in FIG. 1A) in cruise vehicle 120.

The release altitude and release speed preferably enable cruise vehicle 120 to maintain sufficient lift to sustain flight following release. The release altitude and the release speed may vary with different applications and designs of carrier vehicle 110 and cruise vehicle 120. Persons of ordinary skill in the art will appreciate that, in some embodiments, release speed of cruise vehicle 120 may be a horizontal flight speed above the stall speed of cruise vehicle 120, so that the cruise vehicle 120 may fly to its destination after the release.

The plurality of rotors of carrier vehicle 110 (e.g., rotors 174*a*, 174*b*, and 174*e* of FIG. 1B) may be powered by a fossil fuel or hydrogen engine, electric or hybrid-electric motor (not shown in FIGS. 1A-1B). In some embodiments, all or some of the plurality of rotors are powered by electric motors (not shown in FIGS. 1A-1B). In some embodiments, the lift rotors comprise one or more sets (e.g. pairs) of lift rotors, and each set of lift rotors may be operable to co-rotate or counter-rotate. For example, carrier vehicle 110 may have multiple dual lift motors and lift rotors that are housed in the same mount.

In some embodiments, cruise vehicle 120 may further include a propulsion system (not shown in FIG. 1A). Propulsion system may enhance acceleration of cruise vehicle 120 to release speed. Referring to FIG. 1B, for example, cruise vehicle 180 may include a propulsion rotor (e.g., a push propeller 184) coupled to a tail of cruise vehicle 180 or a jet mechanism coupled to fuselage 182. In addition, or alternatively, cruise vehicle 180 may include a propulsion rotor coupled to a fore end of cruise vehicle 180 (not shown in FIG. 1B, e.g., pull propeller, or push and pull propeller). Alternatively, propulsion system may comprise an axial compressor. The propulsion system may be powered by an engine or motor to spin, generating thrust, and causing cruise vehicle 180 to move forward horizontally. Accordingly, acceleration time may be decreased.

As shown at stage 2 of FIG. 1A, after releasing cruise vehicle 120, carrier vehicle 110 may return to launch site 130*a*. Alternatively, in some embodiments, carrier vehicle 110 may fly to another position for another flight mission. For example, carrier vehicle 110 may fly to another site (e.g., site 130*b*) to lift another cruise vehicle 120, or fly to another mid-air position to rendezvous with another cruise vehicle 120 for landing.

At stage 3 of FIG. 1A, cruise vehicle 120 may fly to its destination. In some embodiments, cruise vehicle 120 may include a wing which has a lifting surface. Referring to FIG. 1B, for example, cruise vehicle 180 may include wings 183*a*-183*b*. As discussed above, cruise vehicle 120 may have its own propulsion system (not shown in FIG. 1A) that may include a pull propeller, a push propeller (e.g., push propeller 184), both, or an axial compressor to provide thrust. The wing and propulsion system may assist cruise vehicle 120 in flying to its destination.

At stage 4, when cruise vehicle 120 approaches a rendezvous position, carrier vehicle 110 (which may be the same as or different from the specific carrier vehicle 110 used for take-off) may elevate to a rendezvous altitude, accelerate to a rendezvous speed which matches substantially the speed of the cruise vehicle 120, and rendezvous with cruise vehicle 120. In some embodiments, while approaching the rendezvous position, cruise vehicle 120 may send a signal to carrier vehicle 110 on destination site 130*b* near the destination or to the remote-control center (not shown in FIG. 1A) that further notifies carrier vehicle 110. Alternatively, carrier vehicle 110 or remote-control center may detect the approach of cruise vehicle 120.

In either case, carrier vehicle 110 may place the plurality of propulsion systems (e.g., rotors 174*a*-174*b* and 174*e* of FIG. 1B) in the first mode (e.g., driving rotors 174*a*-174*b* to rotate) to lift carrier vehicle 110 to a rendezvous altitude. Carrier vehicle 110 may place the plurality of propulsion systems to the second mode (e.g., driving rotor 174*e* to rotate) at the mean time or after the first mode to accelerate carrier vehicle 110 to a rendezvous speed. The rendezvous altitude and speed may be any suitable altitude and speed for rendezvousing with cruise vehicle 120, respectively, that allow carrier vehicle 110 to capture cruise vehicle 120. For example, the rendezvous altitude may be an altitude that is above or below the altitude of the cruise vehicle 120, and the rendezvous speed may be approximately equal to the flight speed of the cruise vehicle 120.

In some embodiments, the carrier vehicle 110 may transition from the first mode to the second mode over time. Specifically, carrier vehicle 110 may elevate with vertical thrust from propulsion systems. When approaching the rendezvous altitude, carrier vehicle 110 may start horizontal thrust to provide acceleration of horizontal cruise speed. For example, carrier vehicle 110 may power one or more of the lift rotors to elevate with substantially vertical thrust. When approaching the rendezvous altitude, carrier vehicle 110 may power one or more of cruise rotors to accelerate.

The generation of lift over a wing (e.g. wing 173 of FIG. 1B) of carrier vehicle 110 can increase as the carrier vehicle 110 accelerates to cruise speed. Carrier vehicle 110 may decrease vertical thrust. In addition, carrier vehicle 110 may also increase horizontal thrust to expedite the acceleration to cruise speed. For example, carrier vehicle 110 may reduce the vertical thrust of lift rotors (e.g., rotors 174*a* and 174*b* of FIG. 1B) and increase the vertical thrust of cruise rotors (e.g., rotor 174*e* of FIG. 1B). As another example, the carrier vehicle 110 may change the orientation of lift rotors (e.g., tilt rotors) to decrease vertical thrust while increasing horizontal thrust.

Under substantially horizontal thrust, carrier vehicle can accelerate to a transition speed. At the transition speed, the lift over the wing (e.g. wing 173 of FIG. 1B) of the carrier vehicle 110 is preferably sufficient for cruise operation. Carrier vehicle 110 may then decrease or cease providing vertical thrust and fly supported by the lift generated by the wing due to the horizontal speed of the vehicles generating sufficient lift. For example, the carrier vehicle 110 may turn off power to vertical lift rotors (e.g., rotors 174*a* and 174*b* of FIG. 1B). As another example, the carrier vehicle 110 may change the orientation of lift rotors (e.g., tilt rotors) to a direction at which lift rotors substantially or only provide horizontal thrust.

When elevating to the rendezvous altitude and accelerating to rendezvous speed, the carrier vehicle 110 may rendezvous and couple with cruise vehicle 120 with the vertical thrust being reduced or eliminated. After rendezvous, carrier vehicle 110 may decelerate cruise vehicle 120 and turn on vertical thrust for landing. Therefore, carrier vehicle 110 may rendezvous with cruise vehicle 120 without causing cruise vehicle 120 flying through substantial downwash or in-flow of propulsion systems (e.g., rotors) of the carrier vehicle 110.

Carrier vehicle 110 may couple its attach unit (e.g., attach unit 175 of FIG. 1B) to the corresponding attach location (e.g., attach location 185 of FIG. 1B) on cruise vehicle 120 and capture cruise vehicle 120 at the rendezvous position. Carrier vehicle may employ any of the capture mechanisms or location described previously.

At stage 5, carrier vehicle 110 may decelerate and descend to destination site 130*b* with captured cruise vehicle 120. In some embodiments, carrier vehicle 110 may place the plurality of propulsion systems in second mode to decelerate carrier vehicle 110 and cruise vehicle 120 to hover, and then switch the plurality of propulsion systems to the first mode to descend to destination site 130*b*. Persons of ordinary skill in the art would appreciate that, in some embodiments, the first mode and the second mode may be combined. For example, the carrier vehicle can be in a combination of the first mode and the second mode, allowing the carrier vehicle to perform the descending while decelerating the cruise speed.

In some embodiments, the cruise vehicle 120 may assist with the deceleration by using, for example, flaps, reverse thrust, reduced power, and other control mechanisms. In some embodiments, carrier vehicle 110 includes a landing mechanism (not shown in FIGS. 1A-1B), such as landing gear, points, skids, or other landing features. Landing mechanism may be retractable. Carrier vehicle 110 with cruise vehicle 120 may land on landing mechanism of the carrier vehicle 110. Alternatively, cruise vehicle 120 may have a landing mechanism (not shown in FIGS. 1A-1B), and carrier vehicle 110 with cruise vehicle 120 may land on landing mechanism of cruise vehicle 120.

In the sequence of staged flight 100 depicted in FIG. 1A, cruise vehicle 120 may be coupled above or below carrier vehicle 110. In some embodiments, the wing (e.g., wing 173 of FIG. 1B) and the propulsion systems (e.g., rotor 174*e* of FIG. 1B) of carrier vehicle 110 may help carrier vehicle 110 accelerate or decelerate in the horizontal direction for mid-air release or rendezvous, respectively. Further, during the horizontal acceleration and deceleration, propulsion systems of carrier vehicle 110 may be configured to provide horizontal thrust. This may allow the mid-air release and rendezvous maneuver to be performed without cruise vehicle 120 having to fly through downwash or in-flow of propulsion systems (e.g., rotors).

In some embodiments, carrier vehicle 110 and cruise vehicle 120 both have wings (e.g., wing 173 of carrier vehicle 170 and wings 183*a*-183*b* of cruise vehicle 180 of FIG. 1B). This enables them to both be at substantially similar angles of attack in the mid-air release and rendezvous operations, and then to separate or join up smoothly.

Further, wing (e.g., wing 173 of FIG. 1B) of carrier vehicle 110 may enable increased range and cruise speeds with reduced power requirements, allowing multiple release and rendezvous operations with different cruise vehicles on a single carrier vehicle battery charge. Wings on both vehicles also provide the ability for better glide and control in emergency scenarios.

In some embodiments, cruise vehicle 120 may include a landing mechanism (not shown in FIGS. 1A-1B), such as landing gears, landing skids, or other landing features. Landing mechanism may be retractable. Cruise vehicle 120 may land and take off on its own. In some embodiments, the launch site 130*a* or the destination site 130*b* may have a normal runway, allowing cruise vehicle 120 to take off or land on its own at the launch site or destination site.

In some embodiments, carrier vehicle 110 may carry another type of vehicle than a cruise vehicle over shorter distances without any mid-air release or rendezvous. This type of vehicle may hold multiple (e.g., 6-10 or more) passengers or heavy cargo. Studies indicate that an increasing number (e.g., up to 1,000) take-offs and landings per hour may occur at new city Vertiports. Since there can only be a limited number of Vertiports and routes in a dense urban setting, these variations may be helpful to be able to carry more people on crowded routes.

Figure 2A:
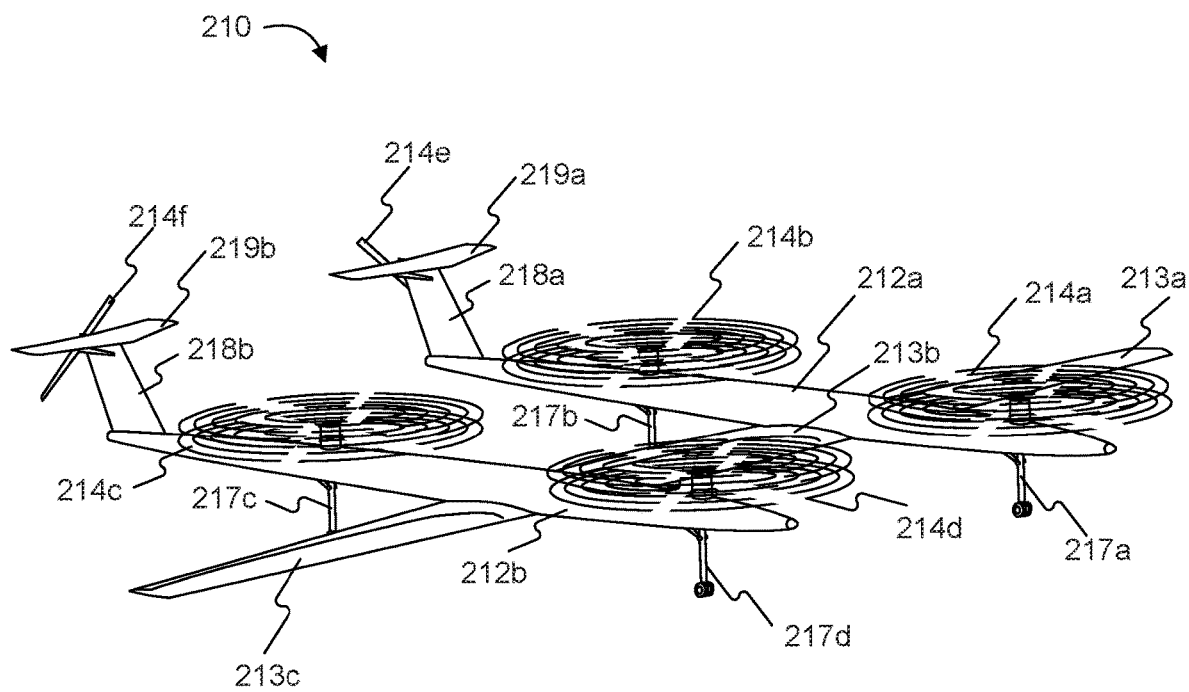
FIG. 2A-FIG. 2B are schematic diagrams of a first exemplary carrier vehicle according to some embodiments of the disclosure.
Figure 2B:
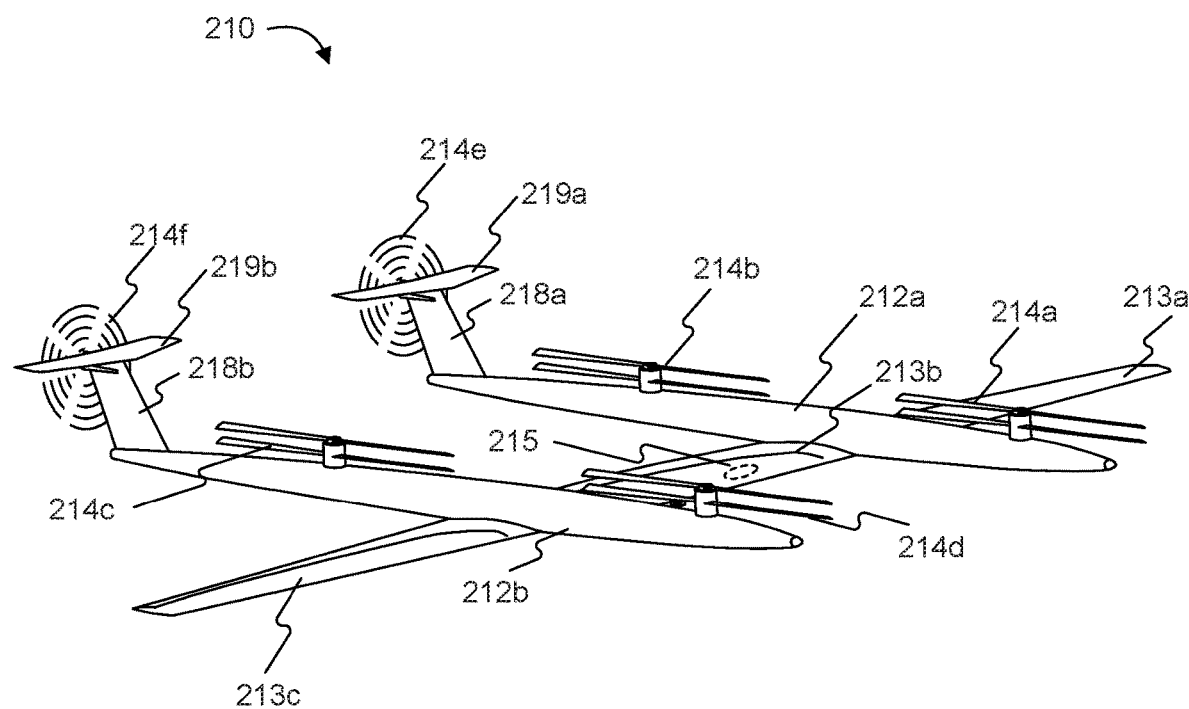

FIG. 2A-2B illustrate schematic diagrams of a first exemplary carrier vehicle 210 according to some embodiments of the disclosure. In some embodiments, carrier vehicle 210 may be implemented as carrier vehicle 110 of FIG. 1A or carrier vehicle 170 of FIG. 1B. In some embodiments, carrier vehicle 210 may be an unmanned, manned, piloted, or remotely piloted fossil fuel, hydrogen, electric, or hybrid electric powered vehicle for VTOL.

As shown in FIGS. 2A-2B, carrier vehicle 210 may include one or more fuselages (e.g., fuselages 212*a*-212*b*), one or more wings (e.g., wing 213), and a plurality of rotors (e.g., rotors 214*a*-214*f*). Wing 213 may include three wing parts 213*a*-213*c* (collectively referred to as wing 213). Wing part 213*a* is coupled to fuselage 212*a*, wing part 213*c* is coupled to fuselage 212*b*, and wing part 213*b* is coupled between fuselages 212*a* and 212*b*. The plurality of rotors may include one or more lift rotors, e.g., rotor 214*a*-214*d*, and one or more cruise rotors, e.g., rotor 214*e*-214*f*. Lift rotors 214*a*-214*d* may be coupled to fuselages 212*a*-212*b*, as shown in FIGS. 2A-2B, or to wing 213 (not shown in FIGS. 2A-2B). Cruise rotors 214*e*-214*f* may be coupled to tails of carrier vehicle 210. The tail may be a T-tail including a vertical tail 218*a* or 218*b* and a horizontal tail 219*a* or 219*b*. In some embodiments, cruise rotor 214*e* or 214*f* may be coupled to the fore end or aft end of fuselage 212*a* or 212*b*.

A plurality of rotors may be operable in, at least, a first mode to provide substantially vertical thrust and a second mode to provide substantially horizontal thrust. For example, in the first mode, the lift rotors 214*a*-214*d* may be powered by an engine or a motor to provide substantially vertical thrust, while in the cruise mode, the cruise rotors 214*e*-214*f* may be powered by an engine or a motor to provide substantially horizontal thrust. An axial compressor may also be used to provide motive power. FIG. 2A illustrates an exemplary first mode of carrier vehicle 210, while FIG. 2B illustrates an exemplary second mode of carrier vehicle 210.

In some embodiments, the lift rotors comprise one or more sets (e.g. pairs) of lift rotors, and each set of lift rotors can be operable to co-rotate or counter-rotate. For example, lift rotor 214*a*, 214*b*, 214*c*, or 214*d* may be a pair of rotors that can co-rotate or counter-rotate, as shown in FIGS. 2A-2B. The plurality of rotors 214*a*-214*f* may be powered by a fossil fuel or hydrogen engine, electric or hybrid-electric motor (not shown in FIGS. 2A-2B). In some embodiments, all or some of the plurality of rotors are powered by electric motors (not shown in FIGS. 2A-2B).

Carrier vehicle 210 may also include an attach unit 215 on wing part 213*b*, as shown in FIG. 2B. In some embodiments, attach unit 215 may be mounted on other parts of carrier vehicle 210, such as fuselage 212*a* or 212*b*. Persons of ordinary skill would appreciate that, although only one is depicted in FIG. 2B, a plurality of attach units 215 may be provided. Attach unit 215 on carrier vehicle 210 may be any suitable device that is adapted to facilitate the coupling and decoupling of carrier vehicle 210 to and from a cruise vehicle. In some embodiments, attach unit 215 of carrier vehicle 210 may be a male or female connector. In some embodiments, attach unit 215 of carrier vehicle 210 may be a universal capture mechanism, such as an adjustable grappling arms to latch onto wings of the cruise vehicle or to fuselage of cruise vehicle, or a cooperating component of cruise vehicle.

As shown in FIG. 2A, carrier vehicle 210 may include a landing mechanism 217. For example, carrier vehicle 210 may have landing gears 217*a*-217*d* (collectively referred to landing mechanism 217). In some embodiments, landing mechanism 217 may include landing points, landing skids, or other landing features. Landing mechanism 217 may be retractable. For example, landing mechanism 217 can be retracted in second mode, as shown in FIG. 2B.

Figure 3A:
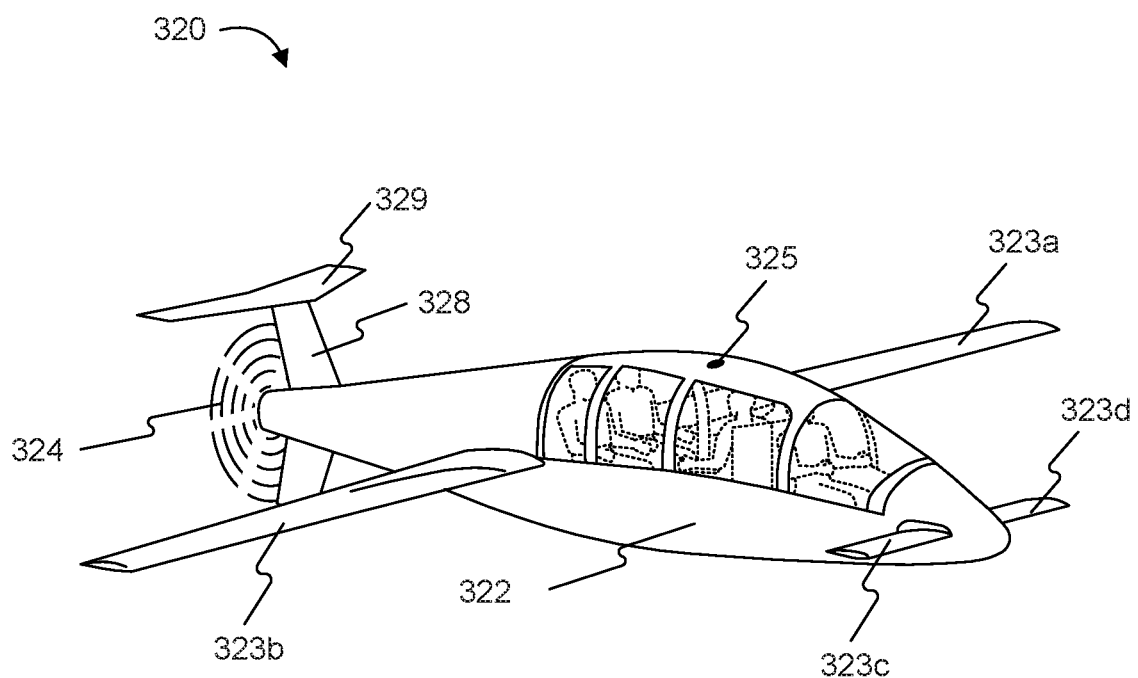
FIG. 3A-FIG. 3B are schematic diagrams of a first exemplary cruise vehicle according to some embodiments of the disclosure.
Figure 3B:
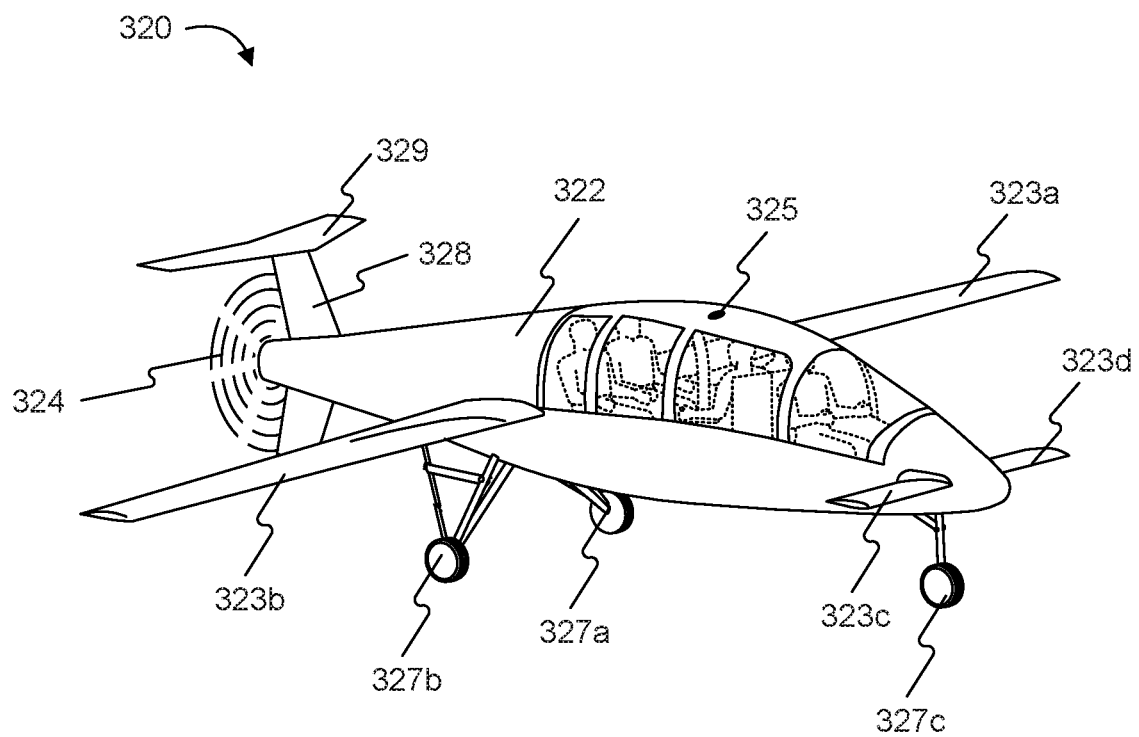

FIGS. 3A-3B are schematic diagrams of a first exemplary cruise vehicle 320 according to some embodiments of the disclosure. It is appreciated that cruise vehicle 320 may be implemented as cruise vehicle 120 of FIG. 1A or cruise vehicle 180 of FIG. 1B. In some embodiments, cruise vehicle 320 may be an unmanned, manned or piloted fossil fuel, hydrogen, electric or hybrid electric powered vehicle for carrying passengers or cargo.

As shown in FIGS. 3A-3B, cruise vehicle 320 may include a fuselage 322 for carrying passengers or cargo and a wing 323 that has wing parts 323*a*-323*d* (collectively referred to as wing 323). In some embodiments, cruise vehicle 320 may include a rotor 324 at an aft end of fuselage 322 (e.g., a push propeller). In addition, or alternatively, rotor 324 may be mounted at a fore end of fuselage 322 (e.g., a pull propeller). Rotor 324 may be a pull and push propeller. In some embodiments, cruise vehicle 320 may include a pair of pull or push rotors (not shown) mounted at wing part 323*a* and wing part 323*b*. Wing 323 and rotor 324 can facilitate a flight of cruise vehicle 320 to the destination after release from a carrier vehicle (e.g., carrier vehicle 110 of FIG. 1A, carrier vehicle 170 of FIG. 1B, or carrier vehicle 210 of FIGS. 2A-2B).

Cruise vehicle 320 may include an attach location 325 on fuselage 322. In some embodiments, attach locations 325 may be located on wing 323 of cruise vehicle 320. Attach locations 325 on cruise vehicle 320 can be coupled to attach unit on carrier vehicle (e.g., attach unit 175 of carrier vehicle 170 in FIG. 1B, or attach unit 215 of carrier vehicle 210 in FIG. 2B), allowing carrier vehicle to capture and carry cruise vehicle 320.

As shown in FIG. 3B, in some embodiments, cruise vehicle 320 may include a landing mechanism 327, such as landing gears, landing skids, or the like. For example, landing mechanism 327 may have landing gears 327*a*-327*c* (collectively referred to as landing mechanism 327). Landing mechanism may be retractable and can be retracted during cruise, as shown in FIG. 3A. With landing mechanism, cruise vehicle 320 may land and take off on its own. In some embodiments, the launch site (e.g., launch site 130*a* of FIG. 1A) or the destination site (e.g., destination site 130*b* of FIG. 1A) may have a normal runway, allowing cruise vehicle 320 to take off or land on the runway at the launch site or destination site.

Figure 4:
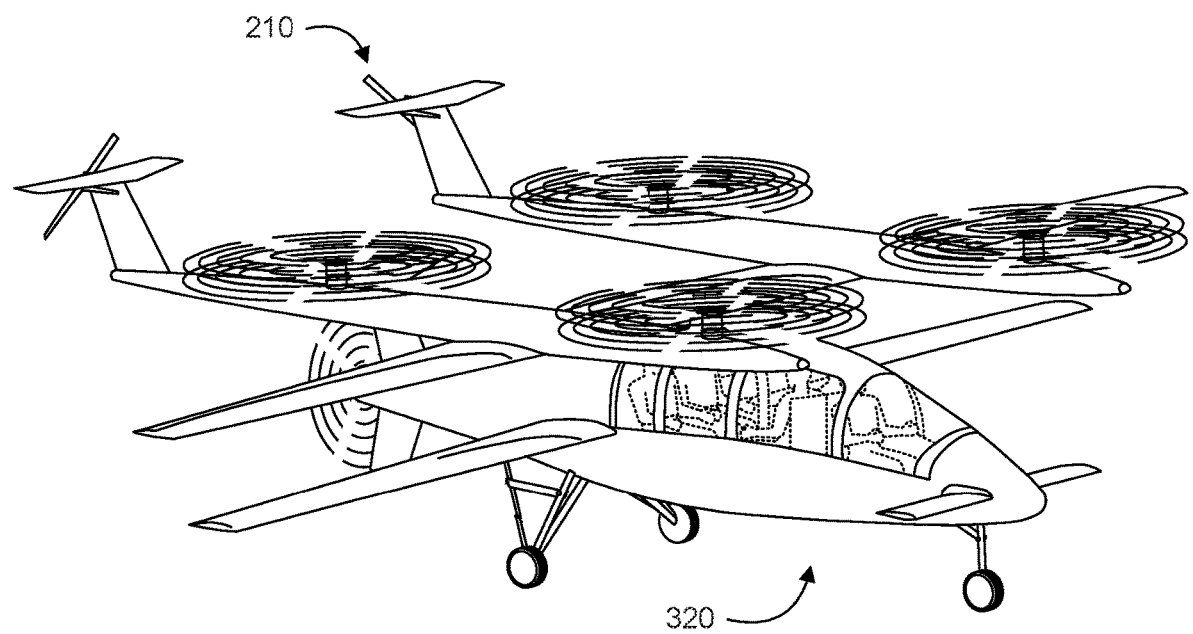
FIG. 4 is a schematic diagram of a first exemplary VTOL vehicle system according to some embodiments of the disclosure.

FIG. 4 illustrates a schematic diagram of a first exemplary VTOL vehicle system 400 according to some embodiments of the disclosure. Persons of ordinary skill in the art would appreciate that vehicle system 400 can be implemented as vehicle system 150 of FIG. 1A or vehicle system 160 of FIG. 1B.

As shown in FIG. 4, vehicle system 400 includes carrier vehicle 210 and cruise vehicle 320 with attach unit 215 of carrier vehicle 210 being coupled to corresponding attach location 325 of cruise vehicle 320. Carrier vehicle 210 can carry cruise vehicle 320 for VTOL. In some embodiment, during VTOL, vehicle system 400 may utilize landing mechanism 327 of cruise vehicle 320.

Figure 5:
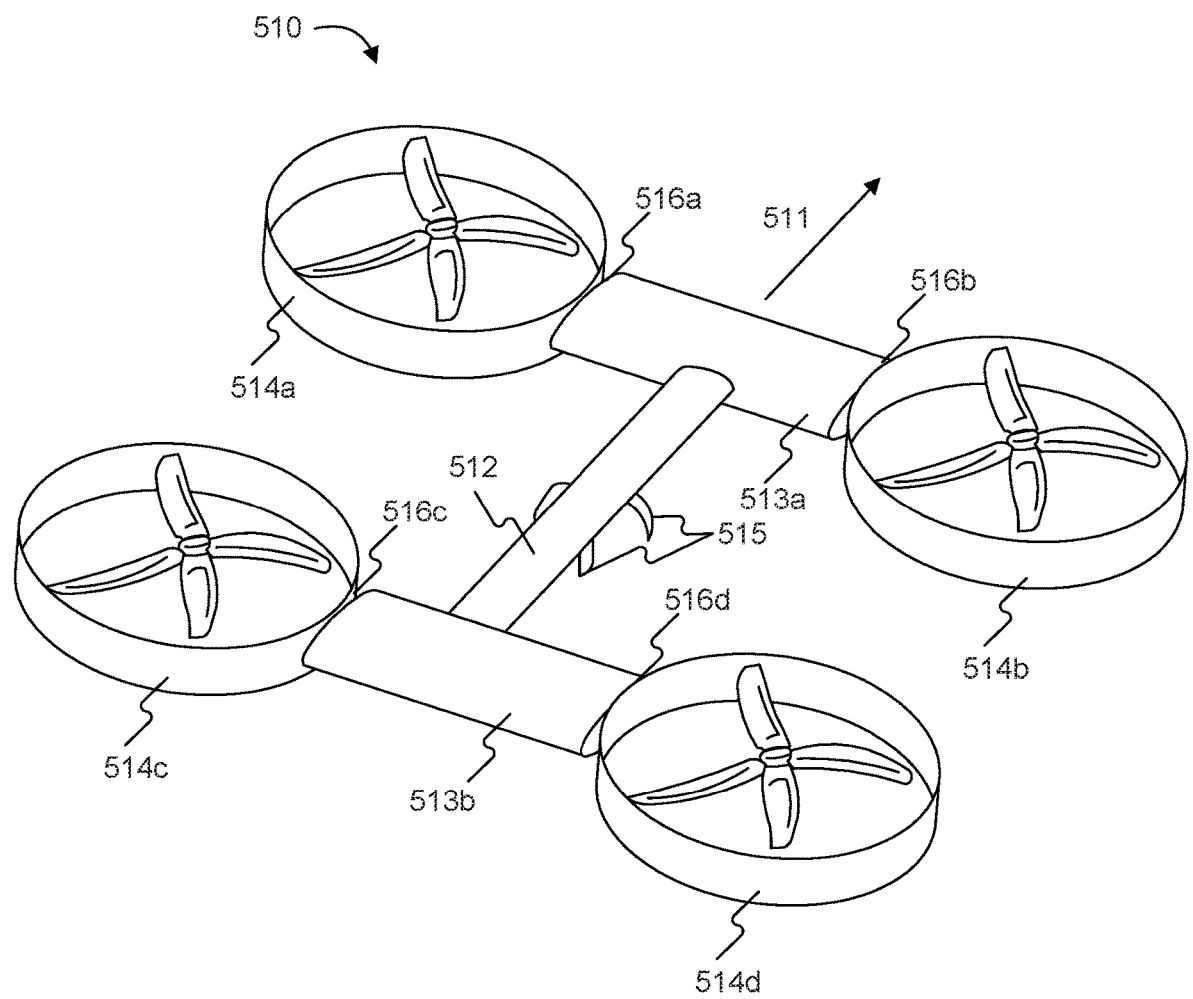
FIG. 5 is a schematic diagram of a second exemplary carrier vehicle according to some embodiments of the disclosure.

FIG. 5 illustrates a schematic diagram of a second exemplary carrier vehicle 510 according to some embodiments of the disclosure. Persons of ordinary skill in the art will appreciate that carrier vehicle 510 can be implemented as carrier vehicle 110 of FIG. 1A. In some embodiments, carrier vehicle 510 may be an unmanned, manned, piloted, or remotely piloted fossil fuel, hydrogen, electric, or hybrid electric vehicle for VTOL. In FIG. 5, an arrow 511 indicates a forward direction of carrier vehicle 510.

Carrier vehicle 510 may have one or more wings and a plurality of rotors. For example, as shown in FIG. 5, carrier vehicle 510 has quad-rotor and dual-wing configuration. Carrier vehicle 510 may include a fuselage 512, a fore wing 513a coupled to a fore end of fuselage 512, and an aft wing 513b coupled to aft end of fuselage 512. The wings 513a-513b provide lifting surfaces for carrier vehicle 510. In some embodiments, at least a part of the wing 513a or 513b is a tilt wing coupled to the fuselage 512 or other part of the wing via a pivot (not shown in FIG. 5). Carrier vehicle 510 may also include four rotors 514a-514d (collectively referred to as rotor 514). A fore pair of rotors 514a-514b are coupled to left and right ends of fore wing 513a, respectively, and an aft pair of rotors 514c-514d are coupled to left and right ends of aft wing 513b, respectively.

A plurality of rotors 514 may be operable in at least two modes. In a first mode, the plurality of rotors 514 may provide substantially vertical thrust. In a second mode, the plurality of rotors 514 may provide substantially horizontal thrust. In some embodiments, the plurality of rotors 514 may include, at least, a lift rotor which is operable, in the first mode, to provide substantially vertical thrust and a cruise rotor which is operable, in the second mode, to provide substantially horizontal thrust. Specifically, in the first mode, the lift rotor may include one or more rotors which may be powered by an engine, motor, or axial compressor to provide substantially vertical thrust, while in the second mode, the cruise rotor may include one or more rotors which may be powered by an engine, motor, or axial compressor to provide substantially horizontal thrust. The lift rotor and cruise rotor may be independent of each other, interchangeable with each other, or identical.

In some embodiments, the plurality of rotors 514 may include one or more tilt rotors. Each tilt rotor 514 may be coupled to an end of wing 513 via a pivot 516, such as 516a, 516b, 516c and 516d (collectively, referred to as pivot 516). Pivot 516 may allow tilt rotor 514 to rotate and transition among different orientations. The orientation of a rotor refers to a direction perpendicular to the rotation plane of the rotor. If tilt rotor 514 is in a vertical orientation, it may operate to provide substantially vertical thrust to allow carrier vehicle 510 to rise or descend. If tilt rotor 514 is in a horizontal orientation, it may operate to provide substantially horizontal thrust to accelerate or decelerate carrier vehicle 510. As shown in FIG. 5, rotors 514a-514d are tilt rotors. In the first mode, rotors 514a-514d may be in the vertical direction to provide substantially vertical thrust, and in the second mode, rotors 514a-514d may be in the horizontal direction to provide substantially horizontal thrust. In some embodiments, each of rotors 514a-514d may be a pair of rotors that can co-rotate or counter-rotate.

As shown in FIG. 5, carrier vehicle 510 also includes an attach unit 515 on fuselage 512. A plurality of attach units 515 may be provided, although only one (with four elements) is depicted in FIG. 5. Attach unit 515 may be mounted on fuselage 512. Attach unit 515 on carrier vehicle 510 may be any suitable device that is adapted to facilitate the coupling and capture of carrier vehicle 510 to cruise vehicle. In some embodiments, attach unit 515 of carrier vehicle 510 may be a male or female connector. In some embodiments, attach unit 515 of carrier vehicle 510 may be a universal capture mechanism, such as an adjustable grappling arms to latch onto a wing of the cruise vehicle or to a fuselage of cruise vehicle.

Although not shown in FIG. 5, carrier vehicle 510 may include landing mechanism. For example, in some embodiments, carrier vehicle 510 may have landing gears, points, skids, or other landing features. In some embodiments, each of the rotors 514a-d is coupled to and powered by electric motor (not shown in FIG. 5). In some embodiments, carrier vehicle 510 may have multiple dual electric motors and rotors housed in the same mount.

Figure 6:
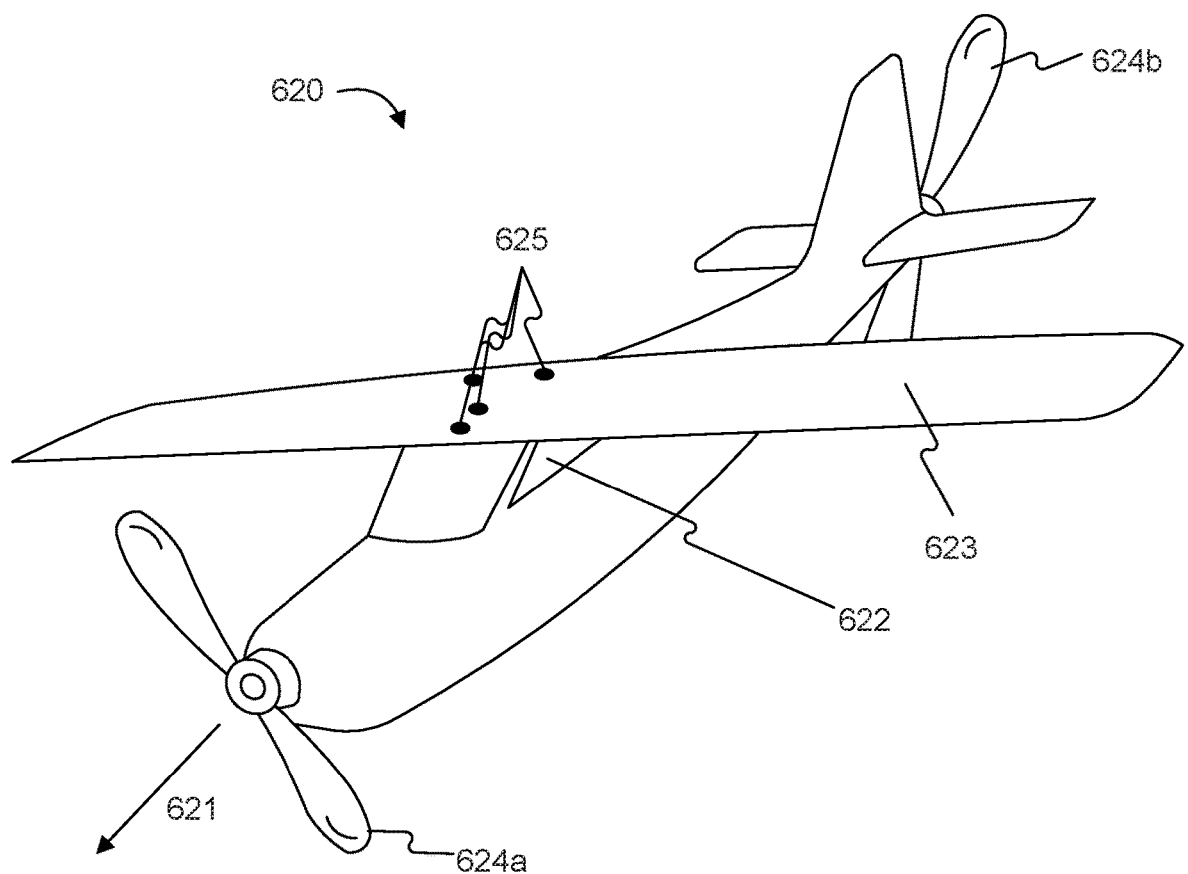
FIG. 6 is a schematic diagram of a second exemplary cruise vehicle according to some embodiments of the disclosure.

FIG. 6 illustrates a schematic diagram of a second exemplary cruise vehicle 620 according to some embodiments of the disclosure. Persons of ordinary skill in the art would appreciate that cruise vehicle 620 may be implemented as cruise vehicle 120 of FIG. 1A. In some embodiments, cruise vehicle 620 may be an unmanned, manned or piloted fossil fuel, hydrogen, electric or hybrid electric powered vehicle for carrying passengers or cargo. Arrow 621 indicates a forward direction of cruise vehicle 620.

Cruise vehicle 620 includes a fuselage 622 for carrying passengers or cargo and fixed single wing 623. In some embodiments, cruise vehicle 620 may include a pull rotor (e.g., a propeller) 624a at a fore end of fuselage 622, a push rotor (e.g., a propeller) 624b at an aft end of fuselage 622, or both. Alternatively, propulsion system may include an axial compressor.

In some embodiments, cruise vehicle 620 may include attach locations 625. Attach locations 625 may be on wing 623 of cruise vehicle 620. The embodiment of cruise vehicle 620 depicted has four attach locations 625 on wing 623. Attach locations 625 on cruise vehicle 620 can be coupled to attach unit on carrier vehicle (e.g., attach unit 175 of carrier vehicle 170 in FIG. 1, attach unit 215 of carrier vehicle 210 in FIG. 2B, or attach unit 515 of carrier vehicle 510 of FIG. 5), allowing carrier vehicle (e.g., carrier vehicle 510 of FIG. 5) to carry and capture cruise vehicle 620.

Although not shown in FIG. 6, in some embodiments, cruise vehicle 620 may include a landing mechanism, such as landing gears, landing skids, or other landing features. Landing mechanism may be retractable. Cruise vehicle 620 may land and take off on its own. In some embodiments, the launch site (e.g., launch site 130a of FIG. 1A) or the destination site (e.g., destination site 130b of FIG. 1B) may have a normal runway, allowing cruise vehicle 620 to take off or land on its own at the launch site or destination site.

Figure 7:
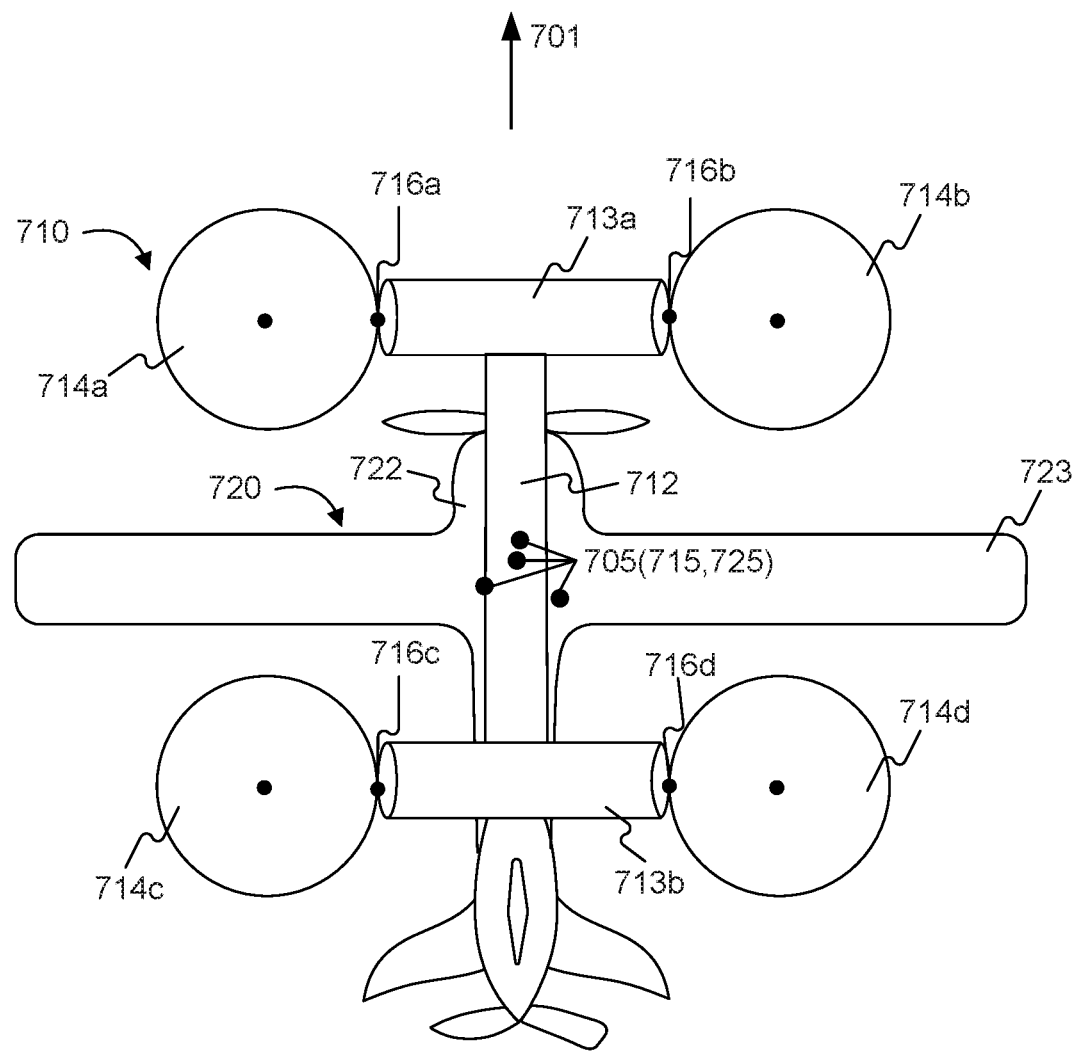
FIG. 7 is a schematic top view of a second exemplary VTOL vehicle system according to some embodiments of the disclosure.

FIG. 7 is a schematic top view of a second exemplary VTOL vehicle system 700 according to some embodiments of the disclosure. Vehicle system 700 may include a carrier vehicle 710 (e.g., carrier vehicle 510 of FIG. 5) and cruise vehicle 720 (e.g., cruise vehicle 620 of FIG. 6). Persons of ordinary skill in the art would appreciate that vehicle system 700, carrier vehicle 710 and cruise vehicle 720 can be implemented as vehicle system 150, carrier vehicle 110 and cruise vehicle 120 of FIG. 1A, respectively. Arrow 701 indicates the forward direction of carrier vehicle 710 and cruise vehicle 720.

As shown in FIG. 7, attach unit 715 on the bottom of fuselage 712 of carrier vehicle 710 is coupled to attach locations 725 on the top of wing 723 of cruise vehicle 720 (indicated by four black dots 705). Fuselage 712 of carrier vehicle 710 is substantially in line with fuselage 722 of cruise vehicle 720. Fore wing 713a of carrier vehicle 710 is positioned in front of wing 723 of cruise vehicle 720. Fore pair of rotors 714a-714b of carrier vehicle 710 are located on either side of fuselage 722 of cruise vehicle 720 and before wing 723 of cruise vehicle 720. Aft wing 713b of carrier vehicle 710 is positioned behind the wing 723 of cruise vehicle 720. Aft pair of rotors 714c-714d of carrier vehicle 710 are located on either side of the fuselage 722 of cruise vehicle 720 and behind wing 723 of cruise vehicle 720. Fore and aft pairs of rotors 714a-714d may be tilt rotors which may be coupled to fore and aft wing 713a-713b of carrier vehicle 710 via pivots 716a-716d. Reference FIGS. 5-6 and related text for additional details about carrier vehicle 710 and cruise vehicle 720.

Figure 8:
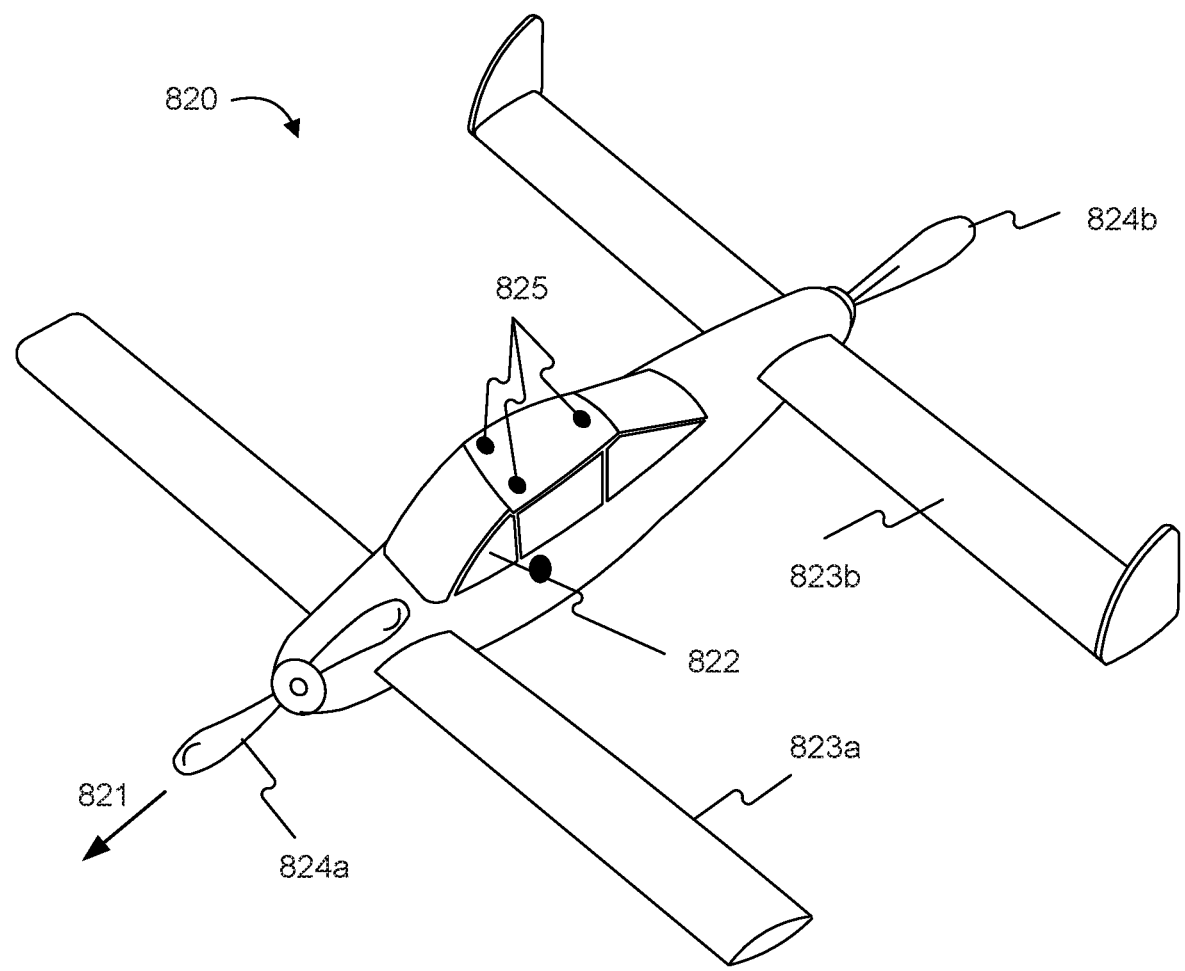
FIG. 8 is a schematic diagram of a third exemplary cruise vehicle according to some embodiments of the disclosure.

FIG. 8 illustrates a schematic diagram of a third exemplary cruise vehicle 820 according to some embodiments of the disclosure. It is appreciated that cruise vehicle 820 can be implemented as cruise vehicle 120 of FIG. 1A. In some embodiments, cruise vehicle 820 may be an unmanned, manned, or piloted fossil fuel, hydrogen, electric, or hybrid electric powered vehicle for carrying passengers or cargo. An arrow 621 indicates a forward direction of cruise vehicle 620.

Cruise vehicle 820 may include a fuselage 822 for carrying passengers or cargo and dual fixed wings 823a-823b. Wing 823a is fixed to fuselage 822 at the fore of cruise vehicle 820, and the other wing 823b is fixed to fuselage 822 at the aft of cruise vehicle 820. In some embodiments, cruise vehicle 820 may include a pull rotor (e.g., a pull propeller) 824a at a fore end of fuselage 822, a push rotor (e.g., a push propeller) 824b at aft end of fuselage 822, or both. Alternatively, propulsion system may comprise an axial compressor.

In some embodiments, cruise vehicle 820 may include attach locations 825. Attach locations 825 may be on fuselage 822 of cruise vehicle 820. The embodiment of cruise vehicle 820 is depicted with three attach locations 825 on top of fuselage 822. Attach location 825 on cruise vehicle 820 can be coupled to attach unit of carrier vehicle (e.g., attach unit 175 of carrier vehicle 170 in FIG. 1, attach unit 215 of carrier vehicle 210 in FIG. 2B, or attach unit 515 of carrier vehicle 510 in FIG. 5), allowing carrier vehicle to carry and capture cruise vehicle 820.

Although not shown in FIG. 8, in some embodiments, cruise vehicle 820 may include a landing mechanism, such as landing gears, landing skids, or other landing features. Landing mechanism may be retractable. Cruise vehicle 820 may land and take off on its own. In some embodiments, the launch site (e.g., launch site 130a of FIG. 1A) or the destination site (e.g., destination site 130b of FIG. 1B) may have a normal runway, allowing cruise vehicle 820 to take off or land on its own at the launch site or destination site.

Figure 9:
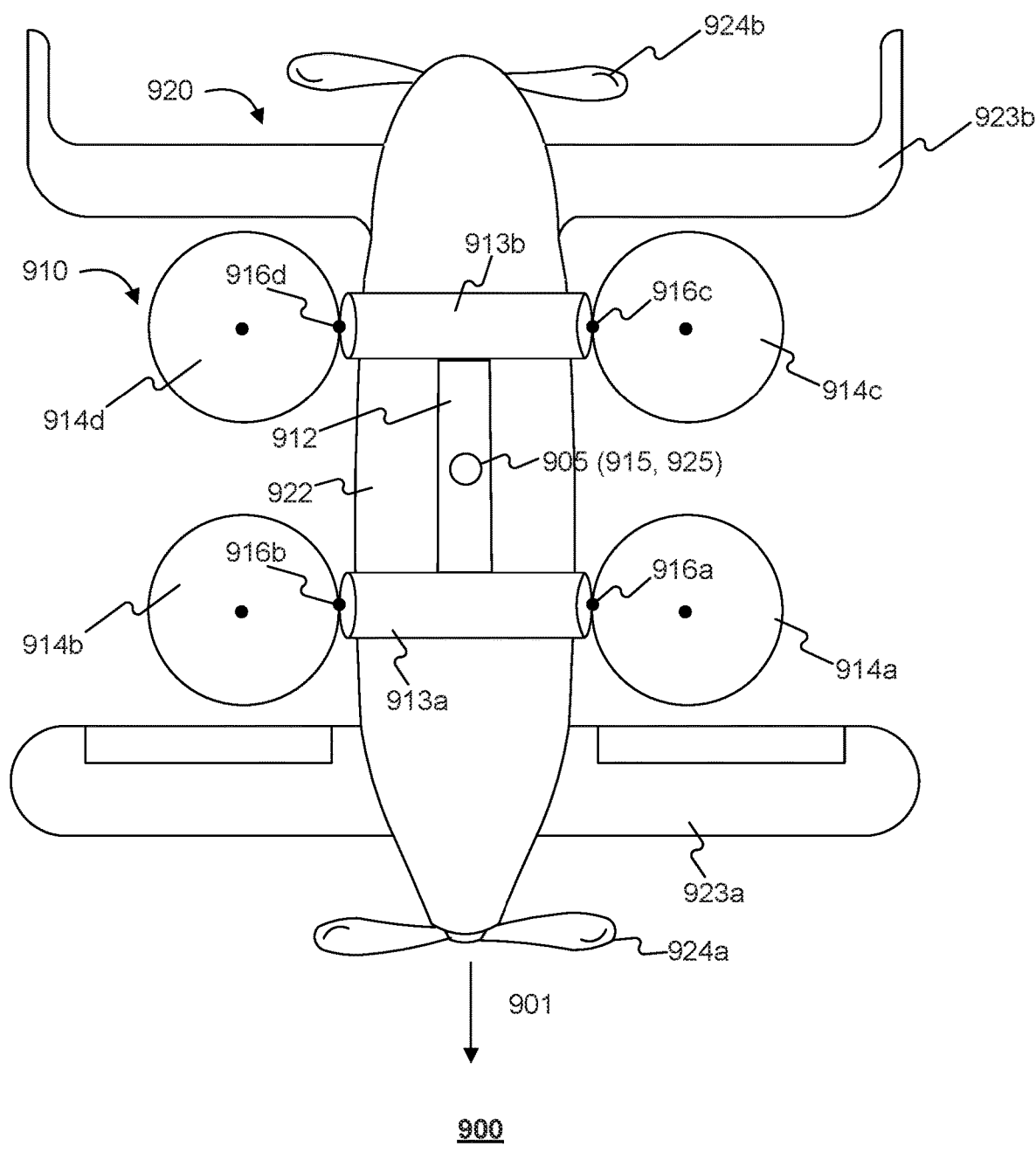
FIG. 9 is a schematic top view of a third exemplary VTOL vehicle system according to some embodiments of the disclosure.

FIG. 9 is a schematic top view of a third exemplary VTOL vehicle system 900 according to some embodiments of the disclosure. Vehicle system 900 may include carrier vehicle 910 (e.g., carrier vehicle 510 of FIG. 5) and dual-wing cruise vehicle 920 (e.g., cruise vehicle 620 of FIG. 6). It is appreciated that vehicle system 900, carrier vehicle 910 and cruise vehicle 920 can be implemented as vehicle system 150, carrier vehicle 110 and cruise vehicle 120 of FIG. 1A, respectively. Arrow 901 indicates the forward direction of carrier vehicle 910 and cruise vehicle 920.

As shown in FIG. 9, attach unit 915 on bottom of fuselage 912 of carrier vehicle 910 are coupled to an attach location 925 on the top of fuselage 922 of cruise vehicle 920 (indicated by a circle 905). Wings 913a-b and fuselage 912 of carrier vehicle 910 are positioned between dual wings 923a-923b of cruise vehicle 920. Fuselage 912 of carrier vehicle 910 is substantially in line with fuselage 922 of cruise vehicle 920. Two pairs of rotors 914a-914d of carrier vehicle 910 are on either side of fuselage 922 of cruise vehicle 920 and between dual wings 923a-923b of cruise vehicle 920.

Rotors 914a-914d of carrier vehicle 910 may be tilt rotors which may be coupled to fore and aft wings 913a-913b of carrier vehicle 910 via pivots 916a-916d. Reference FIG. 5, FIG. 8, and accompanying text for additional details about carrier vehicle 910 and cruise vehicle 920.

Figure 10:
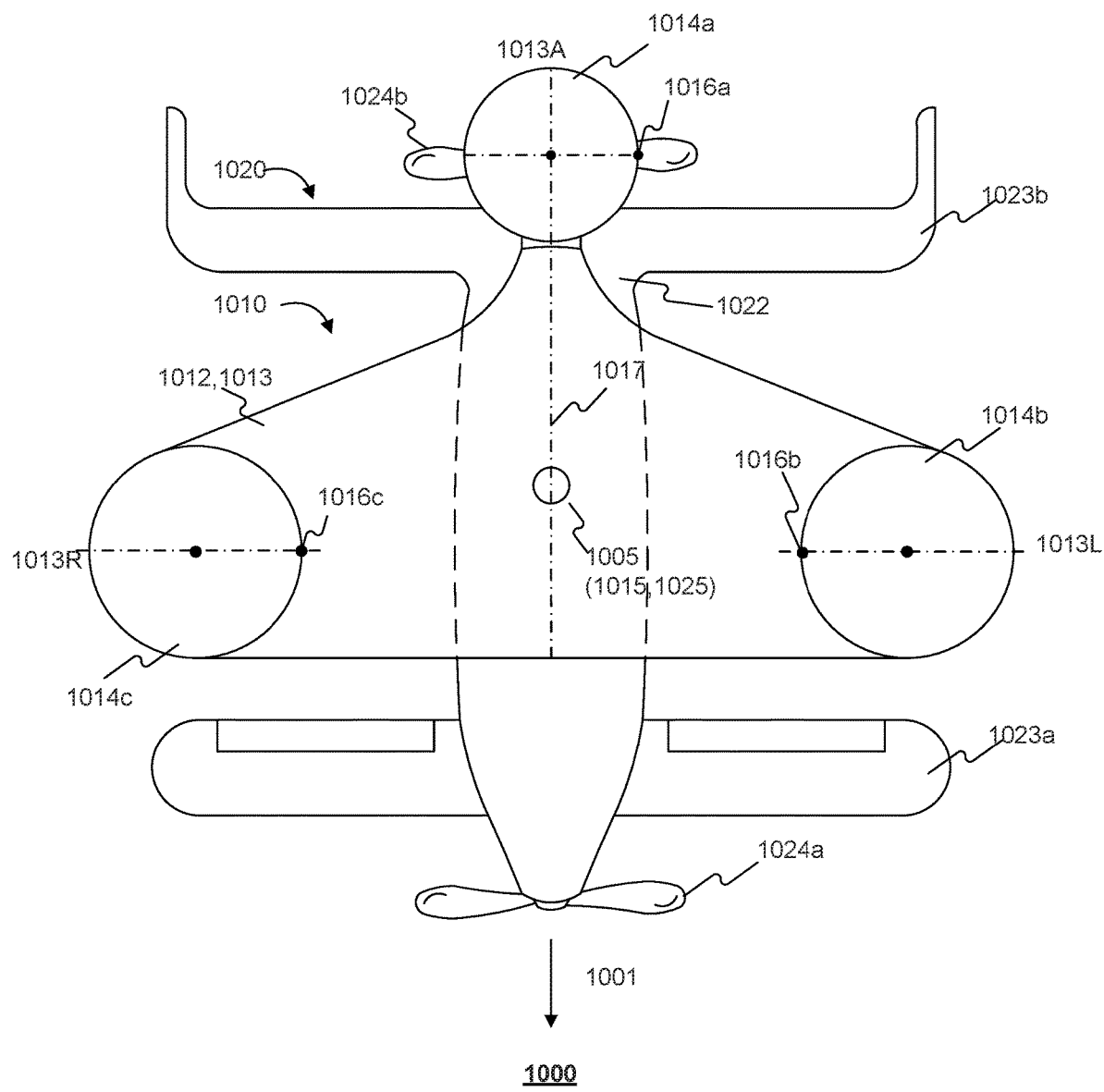
FIG. 10 is a schematic top view of a fourth exemplary VTOL vehicle system according to some embodiments of the disclosure.

FIG. 10 is a schematic top view of a fourth exemplary VTOL vehicle system 1000 according to some embodiments of the disclosure. Vehicle system 1000 may include blended-wing carrier vehicle 1010 and dual-wing cruise vehicle 1020 (e.g., cruise vehicle 820 of FIG. 8). It is appreciated that vehicle system 1000, carrier vehicle 1010 and cruise vehicle 1020 can be implemented as vehicle system 150, carrier vehicle 110 and cruise vehicle 120 of FIG. 1A, respectively. Arrow 1001 indicates the forward direction of carrier vehicle 1010 and cruise vehicle 1020.

As shown in FIG. 10, carrier vehicle 1010 includes wing 1013 blended with fuselage 1012. Blended wing 1013 has a substantially triangle-like shape with one apex 1013A aft, one apex 1013L on the left side, and the other one 1013R on the right side of central line 1017 of blended wing 1013. Central line 1017 extends along the forward direction 1001 of carrier vehicle 1010. Carrier vehicle 1010 includes a plurality of rotors 1014a-1014c. Aft rotor 1014a is coupled to aft apex 1013A of wing 1013, left rotor 1014b is coupled to left apex 1013L of wing 1013, and right rotor 1014c is coupled to right apex 1013R of wing 1013.

In some embodiments, a plurality of rotors 1014a-1014c of carrier vehicle 1010 may be tilt rotors, which may be coupled to blended wing 1013 via pivots 1016a-1016c. The plurality of rotors 1014a-1014c may be operable in at least two orientations. In a first orientation, plurality of rotors 1014a-c provide substantially vertical thrust to allow carrier vehicle 1010 and cruise vehicle 1020 to rise or descend. In a second orientation, plurality of rotors 1014a-1014c provide substantially horizontal thrust to accelerate or decelerate carrier vehicle 1010 and cruise vehicle 1020. The first orientation may be a vertical orientation and the second orientation may be a horizontal orientation.

As shown in FIG. 10, cruise vehicle 1020 may have a fixed dual-wing configuration. Cruise vehicle 1020 may also include a pull rotor (e.g., a pull propeller) 1024a at fore end and a push rotor (e.g., a push propeller) 1024b at aft end. Alternatively, propulsion system may comprise an axial compressor.

Attach unit 1015 on the bottom of fuselage 1012 of carrier vehicle 1010 is coupled to attach location 1025 on the top of fuselage 1022 of cruise vehicle 1020 (indicated by a circle 1005). Central line 1017 of carrier vehicle 1010 is substantially in line with that of fuselage 1022 of cruise vehicle 1020. Aft rotor 1014a of carrier vehicle 1010 is at aft of cruise vehicle 1020, while left rotor 1014b and right rotor 1014c are located on left and right sides of fuselage 1022 of cruise vehicle 1020, respectively, and between its dual wings 1023a-1023b.

In some embodiment, carrier vehicle 1010 may couple with cruise vehicle 1020 with alternate configurations. For example, carrier vehicle 1010 may couple with single wing vehicle, such as cruise vehicle 620 as shown in FIG. 6.

In some embodiments, carrier vehicles 110, 170, 210, 510, 710, 910, 1010 or cruise vehicle 120, 180, 320, 620, 720, 820, 920, 1020 may include a landing mechanism, such as landing gears, landing points, landing skids, or other landing features. Landing mechanism may be retractable. Vehicle systems 150, 160, 400, 700, 900, and 1000 may land on landing mechanism of carrier vehicle or on landing mechanism of cruise vehicle.

Although in vehicle systems 150, 160, 400, 700, 900, and 1000, cruise vehicles 120, 180, 320, 720, 920, and 1020 are coupled below carrier vehicles 110, 170, 210, 710, 910, and 1010, respectively, persons of ordinary skill in the art will appreciate that, in some embodiments, cruise vehicles 120, 180, 320, 720, 920, and 1020 may be coupled above carrier vehicles 110, 170, 210, 710, 910, and 1010, respectively.

Although the first mode and second mode of the carrier vehicles 110, 170, 210, 510, 710, 910 and 1010 are separately described, persons of ordinary skill in the art will appreciate that, in some embodiments, the first mode and the second mode can be combined. For example, the carrier vehicle can be in a combination of the first mode and the second mode, allowing the carrier to perform an acceleration of cruise speed while elevating (with or without a cruise vehicle) into the air, or descend while decelerating the cruise speed (with or without a cruise vehicle).

As used herein, unless specifically stated otherwise, the term "or" encompasses all possible combinations, except where infeasible. For example, if it is stated that a component may include/comprise A or B, then, unless specifically stated otherwise or infeasible, the component may include/comprise A, or B, or A and B. As a second example, if it is stated that a component may include/comprise A, B, or C, then, unless specifically stated otherwise or infeasible, the component may include/comprise A, or B, or C, or A and B, or A and C, or B and C, or A and B and C.

Certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not essential features of those embodiments, unless noted as such.

Although the disclosure has been described in conjunction with specific embodiments, many alternatives, modifications and variations may be apparent to those skilled in the art. Accordingly, the following claims embrace all such alternatives, modifications, and variations that fall within the terms of the claims.

What is claimed is:

1. A vehicle system for vertical take-off and/or landing (VTOL), comprising:
a carrier vehicle, comprising: one or more fuselages, one or more wings, one or more attach units coupled to the one or more fuselages or to the one or more wings, and propulsion systems operable to provide, at least, vertical thrust and horizontal thrust;
a cruise vehicle, comprising: one or more fuselages for carrying passengers or cargo, and one or more wings;
the one or more attach units of the carrier vehicle being adapted to couple to the cruise vehicle to detachably engage,
wherein the propulsion system of the carrier vehicle comprises:
one or more lift rotors coupled to the one or more fuselage or the one or more wings and operable to provide vertical thrust; and
one or more cruise rotors coupled to a fore or aft end of the one or more fuselages or the one or more wings and operable to provide horizontal thrust, and
wherein the one or more lift rotors comprise four pairs of lift rotors, the one or more fuselages of the carrier vehicle comprises two fuselages coupled with one wing, and the one or more cruise rotors comprises two push rotors coupled to two tails of the carrier vehicle.

2. The vehicle system of claim 1, wherein each pair of lift rotors is operable to co-rotate or counter-rotate.

3. The vehicle system of claim 1, wherein the carrier vehicle or the cruise vehicle further comprises landing gears, landing points, or landing skids.

4. The vehicle system of claim 1, wherein the one or more attach units comprises a connector or an adjustable grappling arm.

5. The vehicle system of claim 1, wherein the propulsion systems comprise one or more axial compressors.

6. The vehicle system of claim 1, wherein the cruise vehicle comprises one or more pull rotors, one or more push rotors or both.

7. The vehicle system of claim 1, wherein the cruise vehicle comprises one or more attach locations coupled to the one or more fuselages or to the one or more wings, the one or more attach units of the carrier vehicle being adapted to cooperate with the one or more attach locations of the cruise vehicle to detachably engage.

8. The vehicle system of claim 1, wherein the carrier vehicle or cruise vehicle is fossil fuel, hydrogen, electric, or hybrid electric vehicle.

9. The vehicle system of claim 1, wherein the carrier vehicle is manned or unmanned, and the cruise vehicle is manned or unmanned.

10. The vehicle system of claim 1, wherein the cruise vehicle is a remote piloted aircraft.

11. The vehicle system of claim 1, wherein the one or more lift rotors comprise four or more pairs of lift rotors.

12. A vehicle system for vertical take-off and/or landing (VTOL), comprising:
a carrier vehicle, comprising: one or more fuselages, one or more wings, one or more attach units coupled to the one or more fuselages or to the one or more wings, and propulsion systems operable to provide, at least, vertical thrust and horizontal thrust;
a cruise vehicle, comprising: one or more fuselages for carrying passengers or cargo, and one or more wings;
the one or more attach units of the carrier vehicle being adapted to couple to the cruise vehicle to detachably engage,
wherein the one or more wings of the carrier vehicle comprises a first wing coupled to the fuselage at a fore end of the fuselage and a second wing coupled to the fuselage at an aft end of the fuselage, and
wherein the propulsion systems of the carrier vehicle comprise a first pair of rotors coupled to either end of the first wing and a second pair of rotors coupled to either end of the second wing.

13. The vehicle system of claim 12, wherein the first pair of rotors or the second pair of rotors is operable in a first orientation to provide vertical thrust, and the first pair of rotors or the second pair of rotors is operable in a second orientation to provide substantially horizontal thrust.

14. The vehicle system of claim 13, wherein the first pair of rotors is coupled to either end of the first wino via pivots and a second pair of rotors is coupled to either end of the second wing via pivots.

15. The vehicle system of claim 12, wherein the carrier vehicle or the cruise vehicle further comprises landing gears, landing points, or landing skids.

16. The vehicle system of claim 12, wherein the one or more attach units comprises a connector or an adjustable grappling arm.

17. The vehicle system of claim 12, wherein the cruise vehicle comprises one or more pull rotors, one or more push rotors or both.

18. A vehicle system for vertical take-off and/or landing (VTOL), comprising:
   a carrier vehicle, comprising: one or more fuselages, one or more wings, one or more attach units coupled to the one or more fuselages or to the one or more wings, and propulsion systems operable to provide, at least, vertical thrust and horizontal thrust;
   a cruise vehicle, comprising: one or more fuselages for carrying passengers or cargo, and one or more wings;
   the one or more attach units of the carrier vehicle being adapted to couple to the cruise vehicle to detachably engage,
   wherein the one or more wings of the carrier vehicle comprises a wing blended with the fuselage, and
   wherein the blended wing has a triangle-like shape, and the propulsion systems comprise an aft rotor coupled to the wing at the aft apex of the wing, a left rotor coupled to the wing at the left apex of the wing and a right rotor coupled to the wing at the right apex of the wing.

19. The vehicle system of claim 18, wherein the aft rotor, the left rotor, or the right rotor is operable in a first orientation to provide vertical thrust, and the aft rotor, the left rotor, or the right rotor is operable in a second orientation to provide horizontal thrust.

20. The vehicle system of claim 19, wherein the aft rotor, the left rotor, and the right rotor are coupled to the wing via pivots.

21. The vehicle system of claim 18, wherein the carrier vehicle or the cruise vehicle further comprises landing gears, landing points, or landing skids.

22. The vehicle system of claim 18, wherein the one or more attach units comprises a connector or an adjustable grappling arm.

23. The vehicle system of claim 18, wherein the cruise vehicle comprises one or more pull rotors, one or more push rotors or both.

* * * * *

UNITED STATES PATENT AND TRADEMARK OFFICE
CERTIFICATE OF CORRECTION

PATENT NO. : 10,919,629 B2
APPLICATION NO. : 16/788935
DATED : February 16, 2021
INVENTOR(S) : James Gull et al.

Page 1 of 1

It is certified that error appears in the above-identified patent and that said Letters Patent is hereby corrected as shown below:

In the Claims

Claim 14, Column 17, Line 7, "wino" should read as --wing--.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*